United States Patent
Ogata et al.

(10) Patent No.: US 8,127,047 B2
(45) Date of Patent: Feb. 28, 2012

(54) STORAGE SYSTEM AND ITS MULTIPLE EXTENT EXCLUSIVE CONTROL METHOD

(75) Inventors: Ran Ogata, Odawara (JP); Akihiro Mori, Odawara (JP); Junichi Muto, Odawara (JP); Kazue Jindo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 267 days.

(21) Appl. No.: 12/311,520

(22) PCT Filed: Mar. 6, 2009

(86) PCT No.: PCT/JP2009/054823
§ 371 (c)(1),
(2), (4) Date: Apr. 2, 2009

(87) PCT Pub. No.: WO2010/100768
PCT Pub. Date: Sep. 10, 2010

(65) Prior Publication Data
US 2011/0029698 A1 Feb. 3, 2011

(51) Int. Cl.
*G06F 3/00* (2006.01)
(52) U.S. Cl. ......... 710/5; 710/6; 710/7; 710/20; 710/24; 710/31; 710/32; 710/33; 710/36
(58) Field of Classification Search ................ 710/5, 6, 710/7, 20, 24, 31, 32, 33, 36
See application file for complete search history.

(56) References Cited

U.S. PATENT DOCUMENTS

| | | | | |
|---|---|---|---|---|
| 6,240,467 | B1 * | 5/2001 | Beardsley et al. | 710/5 |
| 7,310,689 | B2 * | 12/2007 | Goode et al. | 710/5 |
| 7,664,909 | B2 * | 2/2010 | Pettey | 711/112 |
| 7,702,879 | B2 * | 4/2010 | Yudenfriend et al. | 711/201 |
| 2005/0050274 | A1 | 3/2005 | Araki et al. | |

* cited by examiner

FOREIGN PATENT DOCUMENTS

| | | |
|---|---|---|
| JP | 2000-181773 | 12/1998 |
| WO | WO 98/28684 A1 | 12/1997 |

OTHER PUBLICATIONS

P. Rogers et al., "ABCs of S/390 System Programming vol. 5". IBM Redbooks Collections, Apr. 25, 2000, pp. i-xvi and 93-126.

*Primary Examiner* — Tariq Hafix
*Assistant Examiner* — Jasjit Vidwan
(74) *Attorney, Agent, or Firm* — Stites & Harbison PLLC; Juan Carlos A. Marquez, Esq.

(57) ABSTRACT

Proposed is technology for shortening the time required for analyzing and processing commands issued from multiple hosts and speeding up the processing. When a controller receives a command including random IO processing and the reception of commands is complete, it determines whether the valid extents prescribed in seek parameters attached to an LOC command overlap, and executes extent exclusive wait processing which causes access to the logical volume to enter a wait state or access processing to the logical volume based on the determination result. If the reception of commands is incomplete, the controller determines whether the access ranges (extents) designated in a DX command overlap, and executes extent exclusive wait processing or access processing to the logical volume based on the determination result.

8 Claims, 14 Drawing Sheets

FIG.5

| CCW NUMBER | COMMAND CODE | ADDRESS | DATA LENGTH | CD (Chain Data) |
|---|---|---|---|---|
| 0 | OX (x63) | a | 0xAAAAAA | 1 |
| 1 | LOC (x47) | b | 0xBBBBBB | 1 |
| 2 | WRD (x05) | c | 0xCCCCCC | 1 |
| 3 | WRD (x05) | d | 0xDDDDDD | 1 |
| 4 | WRD (x05) | e | 0xEEEEEE | 0 |
| 5 | 0 | 0 | 0 | 0 |
| 6 | 0 | 0 | 0 | 0 |
| : | : | : | : | : |
| 63 | 0 | 0 | 0 | 0 |

FIG.7

| LDEV# | IO COUNT | EXTENT RIVAL COUNT | VALID EXTENT AMOUNT | INVALID EXTENT AMOUNT |
|---|---|---|---|---|
| 0x00000000 | 0x00000001 | 0x00000001 | 0x00000001 | 0x00000001 |
| 0x00000001 | 0x00000012 | 0x00000012 | 0x00000012 | 0x00000012 |
| 0x00000002 | 0x00000000 | 0x00000000 | 0x00000000 | 0x00000000 |
| ⋮ | ⋮ | ⋮ | ⋮ | ⋮ |
| 0x00000000 | 0x00000000 | 0x00000000 | 0x00000000 | 0x00000000 |

STORAGE SYSTEM AND ITS MULTIPLE EXTENT EXCLUSIVE CONTROL METHOD

TECHNICAL FIELD

The present invention relates to technology of accessing volumes in response to commands issued from a plurality of hosts.

BACKGROUND ART

Conventionally, a storage system comprising a disk controller and a plurality of disk drives is known as a storage system that analyzes and processes commands from a host. With this kind of storage system, when a command is input from the host to the disk controller, the disk controller is able to execute IO processing by accessing the designated disk drive based on the command.

In the foregoing case, if the storage system is connected to a plurality of hosts, the disk controller analyzes the commands issued from the respective hosts and determines whether at least a part of the access ranges (address ranges for accessing logical volumes created from a plurality of disk drives) designated in each command overlaps. If at least a part of the access ranges overlaps, the disk controller executes extent exclusive wait processing which causes access to a certain host to enter a wait state, and, if at least a part of the access ranges does not overlap, the disk controller executes IO processing for accessing the designated volume in accordance with the command.

Here, extent exclusive wait processing refers to the processing in which, while a disk controller is accessing a logical volume according to a command from a certain host, the access of a host requesting access to the same logical volume is caused to enter a wait state.

In a case where an I/O request (command) is issued from a processor (host) to a controller (disk controller) upon analyzing the command and selecting the processing to be performed, technology has been proposed for storing the extents to be transferred from the processor to the controller in a control memory of the controller, determining an I/O request in which the extents overlap in the volume is being executed, and executing the I/O processing if the extents do not overlap, and storing the wait of the I/O request in the control memory if the extents overlap (refer to Patent Document 1).

RELATED ART DOCUMENTS

[Patent Document 1]
Japanese Patent Laid-Open Publication No. 2000-181773

DISCLOSURE OF THE INVENTION

Meanwhile, in the case of a storage system connected to a plurality of hosts, if the I/O amount per device increases pursuant to the improved performance of the processor or the increased capacity of disks such as disk drives in the host or the disk controller, the checking process of whether the access ranges designated in the command overlap will increase, and, contrarily, the IO performance per device may deteriorate.

However, if the method of determining whether the access ranges designated in the respective commands mutually overlap is used as in the conventional technology in order to deal with the improved performance of the processor or the increased capacity of disks such as disk drives in the host or the disk controller, much time will be required for the extent exclusive wait processing, and this will be insufficient for speeding up the processing.

In light of the above, an object of the present invention is to provide a storage system and its multiple extent exclusive control method capable of shortening the time required for analyzing and processing commands issued from a plurality of hosts and speeding up the processing.

In order to achieve the foregoing object, the present invention is characterized in that a controller that receives commands from a plurality of hosts analyzes whether the IO processing attached to the received commands is random IO processing or sequential IO processing, and executes extent exclusive wait processing or access processing in accordance with the analytical result.

According to the present invention, it is possible to shorten the time required for analyzing and processing commands issued from a plurality of hosts and speed up the processing.

BRIEF DESCRIPTION OF THE DRAWINGS

FIG. 5 is a configuration diagram of an extent table;
FIG. 7 is a configuration diagram of a statistical information management table.

BEST MODE FOR CARRYING OUT THE INVENTION

This embodiment is characterized in that, upon receiving commands from a plurality of hosts, whether the IO processing attached to the received commands is random IO processing or sequential IO processing is analyzed, and extent exclusive wait processing which causes access to the logical volume to enter a wait state or access processing to the logical volume is executed based on the analytical result.

Figure 1:
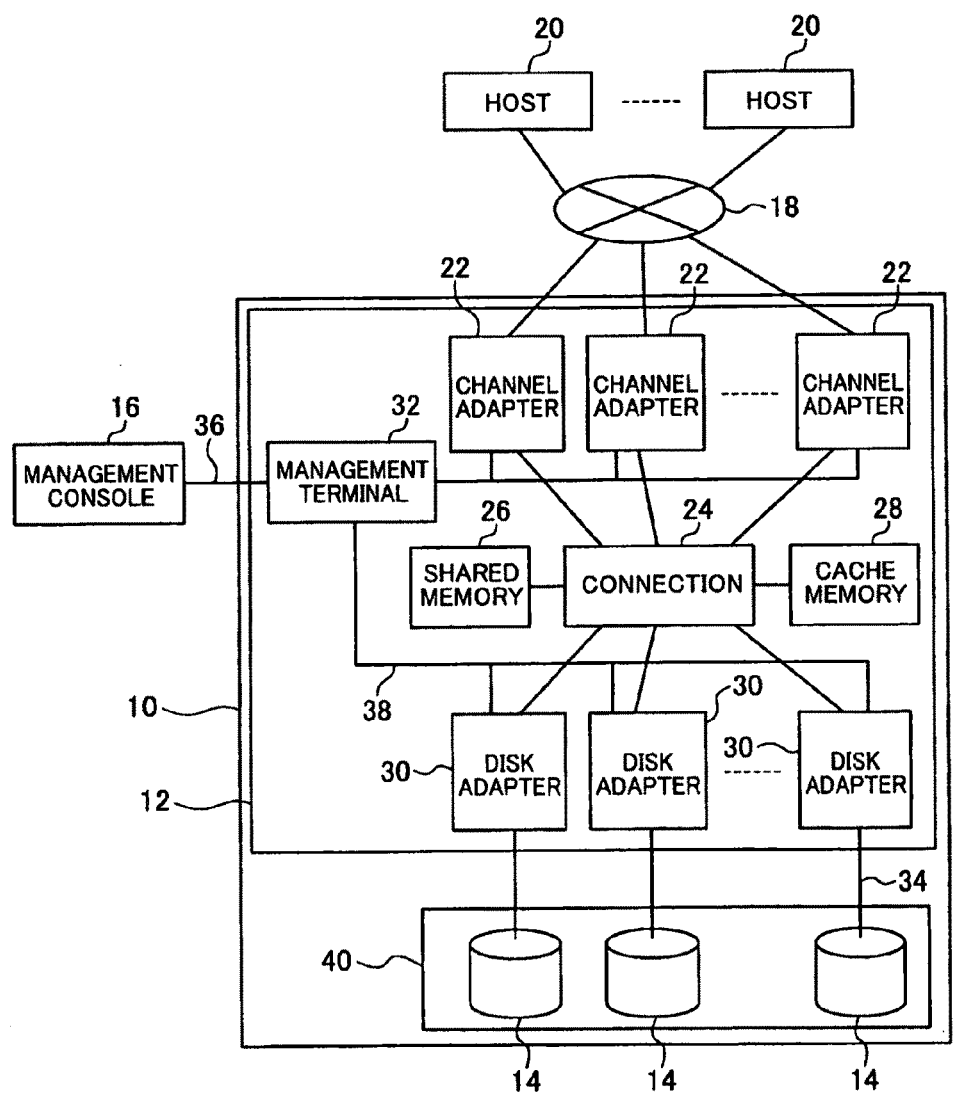
FIG. 1 is a block configuration diagram upon applying the storage system of the present invention to a network system.

An embodiment of the present invention is now explained with reference to the attached drawings. FIG. 1 is a block configuration diagram showing an embodiment upon applying the storage system of the present invention to a network system. In FIG. 1, the storage system 10 comprises a controller 12, a plurality of disk drives 14, and a management console 16, and the controller 12 is connected to a plurality of hosts (host computers) 22 via a network 18.

Each host 20 is configured, for instance, from a SAN (Storage Area Network), LAN (Local Area Network), Internet, public line or dedicated line. The communication between each host 20 and the storage system 10 is conducted according to a fibre channel protocol, for instance, if the network 18 is a SAN, and conducted according to a TCP/IP (Transmission Control Protocol/Internet Protocol) protocol, for instance, if the network 18 is a LAN.

The controller 12 comprises, as an apparatus for interpreting and processing commands from the respective hosts 20 and processing data to be accessed by the respective disk drives 14, a plurality of channel adapters 22, a connection 24, a shared memory 26, a cache memory 28, a plurality of disk adapters 30, and a management terminal 32.

Each channel adapter 22 is configured as a microcomputer system comprising a microprocessor, a memory, a communication interface and the like, and comprises a port for connecting to the network 18. Each channel adapter 22 interprets and executes various commands sent from the respective hosts 20 via the network 18. The port of each channel adapter 22 is allocated with a network address such as an IP (Internet Protocol) address or a WWN (World Wide Name) for identifying the respective ports. Each channel adapter 22 is thereby able to independently function as a NAS (Network Attached Storage).

Connected to the connection 24 are the respective channel adapters 22, the shared memory 26, the cache memory 28 and the respective disk adapters 30. Specifically, the transfer of data and commands among the respective channel adapters 22, the shared memory 26, the cache memory 28 and the respective disk adapters 30 is performed via the connection 24. The connection 24 is configured from a switch such as an ultrafast crossbar switch or a bus for performing data transfer by way of high-speed switching.

The shared memory 26 and the cache memory 28 are storage memories to be shared by the respective channel adapters 22 and the respective disk adapters 30. The shared memory 26 is used as a control memory for primarily storing various types of control information such as the system configuration information concerning the configuration of the overall controller 12, as well as commands. The shared memory 26 additionally stores various tables such as the extent table and the statistical information management table described later. The cache memory 28 is primarily used as a storage area for temporarily storing data to be input to and output from the controller 12.

Each disk adapter 30 is configured as a microcomputer system comprising a microprocessor, a memory and the like, and functions as an interface for controlling the protocol during the communication with respective disk drives 14. Each disk adapter 30 is connected to the disk drives 14, for instance, via a fibre channel cable 34, and sends and receives data to and from the respective disk drives 14 according to the fibre channel protocol.

The management terminal 32 is used for controlling the operation of the overall controller 12, and is connected to the respective channel adapters 22 via a LAN 36 and connected to the respective disk adapters 30 via a LAN 38. The management terminal 32 monitors the failure status in the controller 12, notifies the management console 16 in the event of a failure, and executes block processing to the corresponding disk drive 14 in the controller 12 based on a command given from the management console 16 in accordance with the operator's operation. The operator may also use the management terminal 32 to define the system configuration information. In the foregoing case, the defined system configuration information is stored in the shared memory 26 via the respective channel adapters 22 or the respective disk adapters 30 and the connection 24.

The management console 16 is configured, for instance, from a personal computer, a workstation or a portable information terminal, and is connected to the management terminal 32 of the storage system 10 via the LAN 36. The management console 16 comprises a display device for displaying a GUI (Graphical User Interface) and various types of information for making various settings in the storage system 10, an input device such as a keyboard or a mouse to be used by the operator for making various operations or various setting inputs, and a communication device for communicating with the management terminal 32 of the storage system 10 via the LAN 36.

The management console 16 executes various types of processing based on various commands input via the input device. For example, the management console 16 displays on the display device various types of information such as failure information that is notified from the management terminal 32 of the storage system 10, and sends the various types of set-up information that was input using the GUI displayed on the display device to the management terminal 32.

The plurality of disk drives 14 are configured, for example, from SCSI (Small Computer System Interface) disks, SATA (Serial AT Attachment) disks or optical disks. Each disk drive 14 is able to configure RAID (Redundant Array of Inexpensive Disks), and one or more logical volumes (these are hereinafter referred to as the "logical volumes") 40 are set in a physical storage area. Here, the data to be stored in the respective disk drives 14 is stored in block units configured from blocks (these are hereinafter referred to as the "logical blocks") of a prescribed size in the logical volume 40.

Each logical volume 40 has a cylinder number and a head number defined therein as the address. The host 20 is able to access the data stored in an arbitrary storage area of a specific logical volume 40 by sending the address defined in each logical volume 40 to the control unit (controller 12) of the storage system 10.

Here, since each host 20 is configured as a mainframe system, the commands sent from the respective hosts 20 are sent as mainframe commands.

Each command is configured, for instance, from a CCW (Command Chain Word) which is a code for performing the IO processing, and is normally configured from a CCW chain which is an aggregate of a plurality of CCWs.

A CCW chain is configured, for example, from a DX (Define eXtent) command for defining the extents, an /LOC (LOCate record) command for positioning, a /WRD (WRite Data) command for commanding the writing of data, and a /WRD command.

Figure 2:
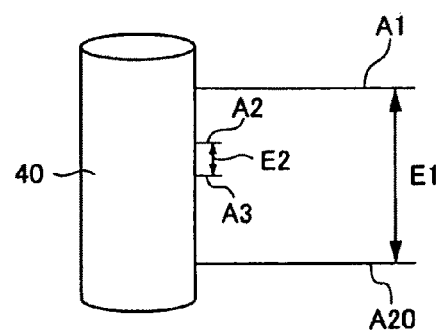
FIG. 2 is a diagram explaining the relationship between a CCW chain and a logical volume extent range.

If the CCW chain is configured from the DX command, the /LOC command, the /WRD command, and the /WRD command, as shown in FIG. 2, the DX command of the CCW chain is an access range (extent range) designated in IO units by the respective hosts 20, and shows a range E1 between a start address A1 and an end address A20. The LOC command is an access range for actually accessing a cylinder head of the logical volume 40, and shows a range E2 between a start address A2 and an end address A3.

Figure 3:
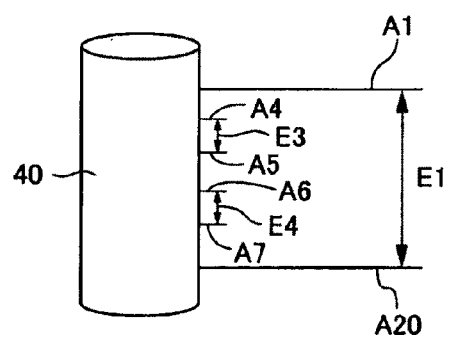
FIG. 3 is a diagram explaining another relationship between a CCW chain and a logical volume extent range.

Moreover, if the CCW chain is configured from the DX command, the /LOC command, the /WRD command, and the /WRD command, as shown in FIG. 3, whereas the DX command is an access range (extent range) E1 showing the range from the address A1 to the address A20, the first LOC command is an access range for actually accessing the cylinder head, and shows a range E3 between the address A4 and the address A5, and the second LOC command is an access range for actually accessing the cylinder head, and shows a range E4 between the address A6 and the address A7. Specifically, each LOC command randomly designates the range for actually accessing the cylinder head.

Figure 4:
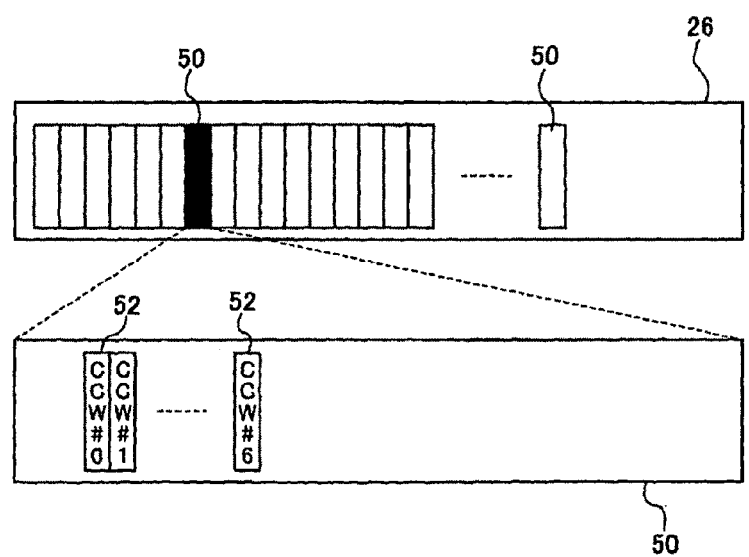
FIG. 4 is a configuration diagram of an extent table.

Information concerning the commands is recorded in the tables stored in the shared memory 26. Among the tables stored in the shared memory 26, the extent table 50 is provided for each CCW chain and, as shown in FIG. 4, each extent table 50 is provided with a plurality of command storage areas 20.

The #0 command storage area 52 among the plurality of command storage areas 52 stores information concerning the #0 CCW; for instance, information of the DX command, the #1 command storage area 52 stores information concerning the #1 CCW; for instance, information of the LOC command, and the #2 command storage area 52 stores information concerning the #2 CCW; for instance, information of the WRD command. The foregoing information is stored in the extent table 54 as shown in FIG. 5.

The extent table 54 is configured from a CCW number 100, a command code 102, an address 104, a data length 106, and a CD (Chain Data) 108. The CCW number 100 is set, in numerical sequence, with numbers 0, 1, 2, 3, . . . , concerning the CCW. The command code 102 corresponding to each CCW number stores the code of the DX command, the code of the LOC command, and the code of the WRD command. The address 104 stores the address of the respective command codes as a, b, c and so on. The data length 106 stores "0xAAAAA," "0xBBBBB," and "0xCCCCC" as information showing the data length corresponding to the respective addresses of a, b, and c. The CD 108 stores the data of "1" if there is a subsequent command as the information showing the status of a subsequent command, and stores the data of "0" if there is no subsequent information.

Figure 6:
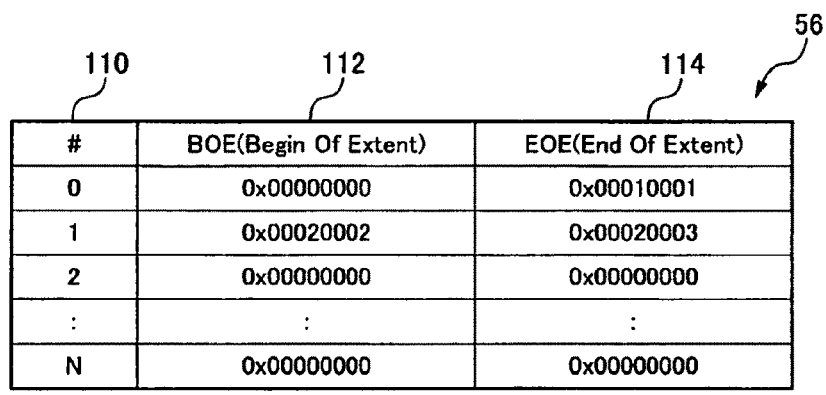
FIG. 6 is a configuration diagram of an extent table.

In addition, as a table to be stored in the shared memory 26, as shown in FIG. 6, there is the extent table 56 storing information for identifying the extent range. The extent table 56 is configured from a number 110, a BOE (Begin Of Extent) 112, and an EOE (End Of Extent) 114. The number 110 comprises numbers 0 to N. The BOE 112 stores address information corresponding to the start address A1 of the logical volume 40 in correspondence with numbers 0 to N. The EOE 114 stores address information corresponding to the end address A20 of the logical volume 40 in correspondence with the numbers 0 to N.

The shared memory 26 additionally stores, as shown in FIG. 7, information concerning the statistical information management table 58. The statistical information management table 58 is configured from an LDEV number 200, an IO count 202, an extent (Extent) competition count 204, a valid extent (Extent) amount 206, and an invalid extent (Extent) amount 208.

The LDEV number 200 is a number corresponding to the respective logical volumes 40. The IO count 202 is the number of IOs that each host 20 accessed each logical volume 40. The extent competition count 204 is the number of times that at least a part of the access ranges (extents) designated in the DX command overlapped within the IO count to the same logical volume 40. Incidentally, in the following explanation, the ratio of the extent competition count 204 occupied in the total IO count to the same logical volume 40 is referred to as the competition ratio.

Figure 8:
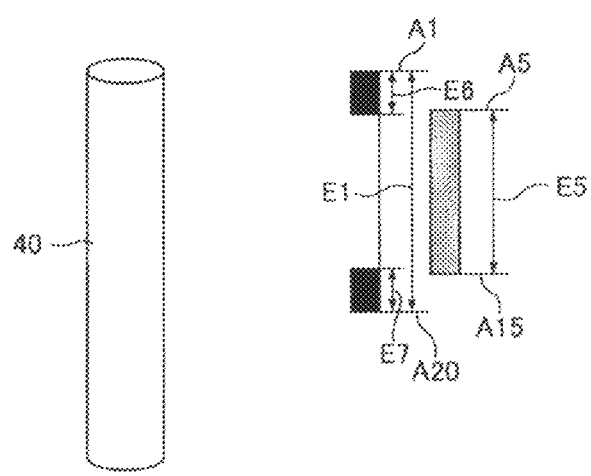
FIG. 8 is a diagram explaining the relationship between a logical volume and a valid extent and an invalid extent.

The valid extent amount 206, as shown in FIG. 8, is the number of addresses included in the address A5 to the address A15 prescribing the valid extent E5 as the access range designated in the LOC command within the access range (extent) E5 designated in the DX command.

The invalid extent amount 208, as shown in FIG. 8, is the number of address belonging to the invalid extents E6, E7 as the access ranges outside the valid extent E5 within the access range E1 designated in the DX command, and the number of addresses belonging to the range between the addresses A1 to A5 and the addresses A15 to A20. Incidentally, in the following explanation, the ratio of the invalid extents E6, E7 occupying the access range (extent) E1 designated in the DX command is referred to as the invalid extent ratio.

Figure 9:
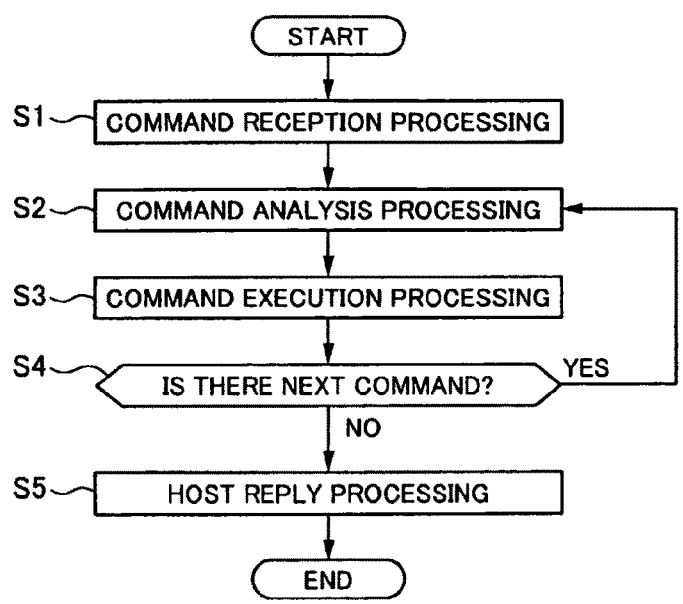
FIG. 9 is a flowchart explaining the IO processing.

The operation of the present embodiment is now explained with reference to the flowchart of FIG. 9. Foremost, when the controller 12 receives commands from the respective hosts 20, it executes the command reception processing (S1). Specifically, when each channel adapter 22 receives a command from each host 20, it stores the various types of information attached to the command in the extent tables 50, 54, 56 of the shared memory 26.

Subsequently, the controller 12 executes processing for analyzing the received commands (S2). For example, if the controller 12 receives commands from a plurality of hosts 20, the controller 12 analyzes whether the IO processing attached to the received commands is random IO processing or sequential IO processing, and executes extent exclusive wait processing which causes access to the logical volume to enter a wait state or access processing to the logical volume based on the analytical result.

Upon analyzing whether the IO processing attached to the received commands is random IO processing or sequential IO processing, the controller 12 may use information concerning the respective commands; for instance, statistically arranged information regarding the reception period to analyze whether the IO processing attached to the commands is random IO processing or sequential IO processing.

The controller 12 may also analyze whether the IO processing attached to the commands is random IO processing or sequential IO processing by monitoring the information showing the status of a subsequent command within the information attached to the received commands, and based on the number of times that information showing that there is no subsequent command occurs per the set period.

Figure 10:
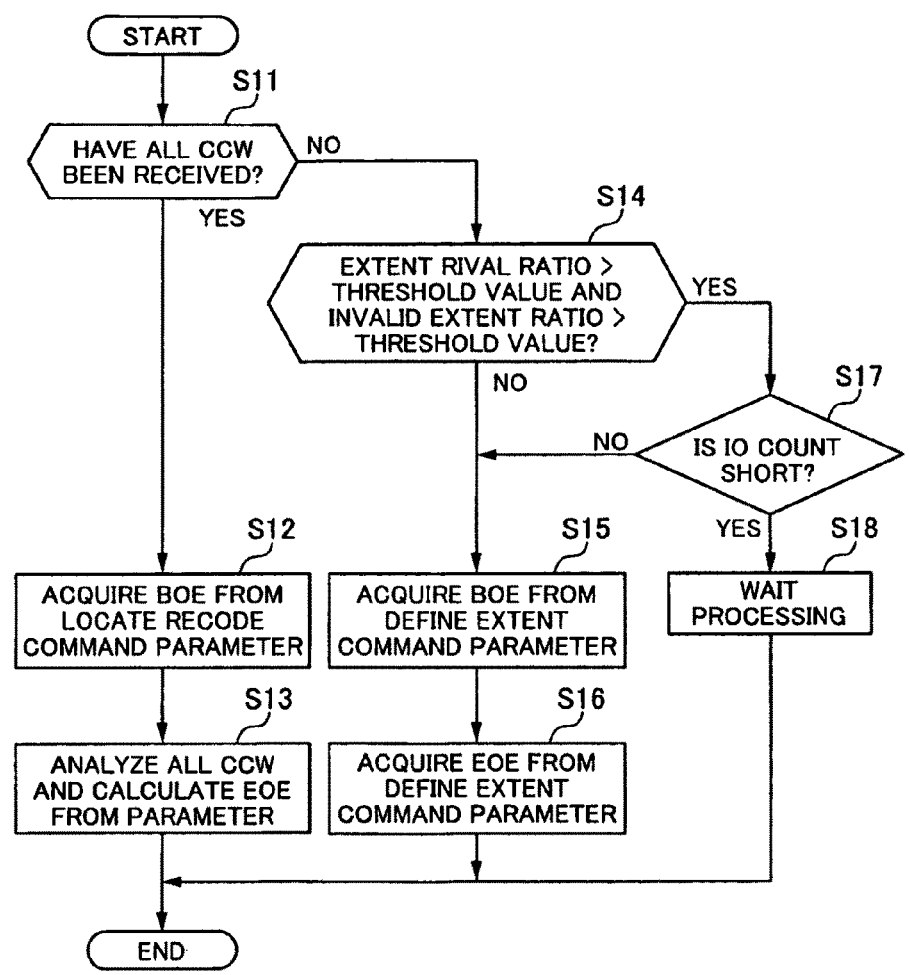
FIG. 10 is a flowchart explaining the DX command analysis processing.

Upon analyzing the received commands, specifically, each channel adapter 22 searches the shared memory 26 during the course of receiving the respective commands as shown in FIG. 10, and determines whether the information of the CD 108 within the information stored in the extent table 54 is "1" (S11).

If the CD 108 is "0" and there is no subsequent command, each channel adapter 22 determines that all CCWs have been received, and acquires the BOE as the address for actually accessing the logical volume 40 based on information such as the seek parameters attached to the LOC command that is subsequent to the DX command (S12). Subsequently, each channel adapter 22 analyzes all CCWs, calculates the EOE as the address for actually accessing the logical volume 40 from the analyzed parameter, and then ends this processing routine (S13).

Specifically, the "b" stored in the address 104 corresponding to the LOC command stores the positioning, cylinder number, and head number as the seek parameters for actually accessing the logical volume 40. Thus, the BOE as the start address and the EOE as the end address for actually accessing the logical volume 40 based on the seek parameters are calculated.

Figure 11:
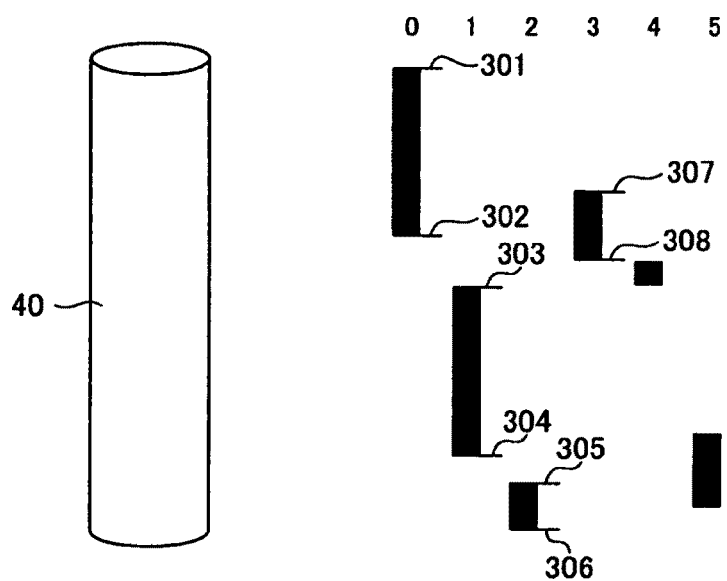
FIG. 11 is a diagram explaining the relationship between a cylinder head and the seek parameters set in the cylinder head.

Here, as shown in FIG. 11, within the logical volume 40, in a case where the BOE 301 and the EOE 302 are set in relation to the #0 IO from the #0 head to the #N head, the BOE 303 and the EOE 304 are set in relation to the #1 IO, and the BOE 305 and the EOE 306 are set in relation to the #2 IO, if the BOE 307 and the EOE 308 are set in relation to the #3 IO, the range from the BOE 307 to the EOE 308 will partially overlap with the range from the BOE 301 to the EOE 302 set in relation to the #0 IO, and, therefore, the #3 IO will be subject to the extent exclusive wait processing as described later.

Meanwhile, if the determination is NO at step S11, each channel adapter 22 determines whether the extent competition ratio is greater than a first threshold value and the invalid extent ratio is greater than a second threshold value (S14). If the determination is NO at this step, each channel adapter 22 acquires the BOE based on the parameters of the DX command since the learning processing will not be executed (S15), and subsequently acquires the EOE (S16). Specifically, each channel adapter 22 performs processing for acquiring the extent E1 which is the access range designated in the DX command and which corresponds to the start address A1 and the end address A20.

If the determination is YES at step S14, each channel adapter 22 determines whether the IO count contained in the command is shorter than a prescribed count (S17), and proceeds to the processing at step S15 if it determines that the IO count is longer than the prescribed count. If each channel adapter 22 determines that the IO count is shorter than the prescribed count, it proceeds to the wait processing until all CCWs are received, and then ends this processing routine (S18).

Subsequently, the controller 12 performs the command execution processing as the processing shown in FIG. 9 (S3). This processing is executed, as shown in FIG. 12, as the extent exclusive check processing to be performed by each channel adapter 22.

Figure 12:
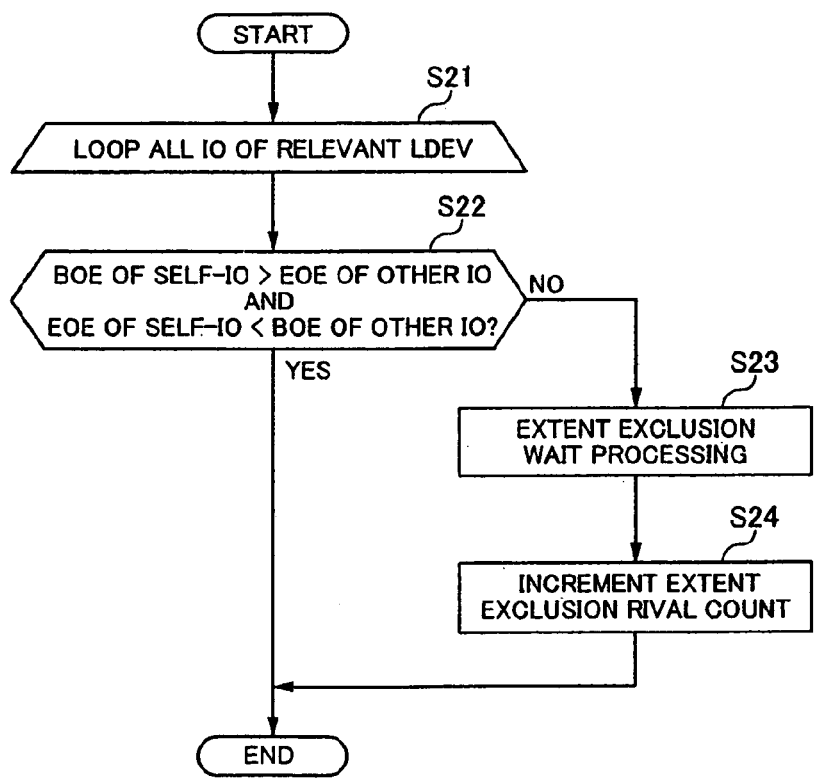
FIG. 12 is a flowchart explaining the extent exclusive check processing.

Foremost, as shown in FIG. 12, each channel adapter 22 forms a loop worth all IOs of the logical volume 40 based on the information attached to the command (S21), and determines whether the BOE of the self-IO is greater than the EOE of the other IOs and whether the EOE of the self-IO is smaller than the BOE of the other IOs (S22).

If the determination is YES at step S22, each channel adapter 22 ends this processing routine since there is no overlapping extent in relation to the self-IO. Meanwhile, if the determination is NO at step S22, each channel adapter 22 proceeds to the extent exclusive wait processing since there is an extent that overlaps with the self-IO (S23). Subsequently, each channel adapter 22 performs count up processing for incrementing the extent exclusive competition count by 1 (S24), and then ends this processing routine.

Subsequently, each channel adapter 22 of the controller 12 determines whether there is a subsequent command as the processing shown in FIG. 9 (S4), returns to the processing at step S2 if there is a subsequent command, and repeats the processing at steps S2, S4. Meanwhile, if it is determined that there is no subsequent command, each channel adapter 22 executes the host reply processing (S5), and then ends this processing routine.

Figure 13:
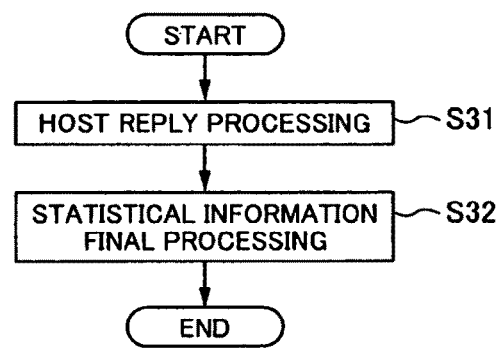
FIG. 13 is a diagram explaining the host reply processing.

As shown in FIG. 13, each channel adapter 22 notifies, as the reply processing to the commands from the respective hosts 20, information on whether access to the logical volume 40 has been executed and information on whether the status is the extent exclusive wait processing and so on to the respective hosts 20. Subsequently, each channel adapter 22 executes the statistical information final processing (S32).

Figure 14:
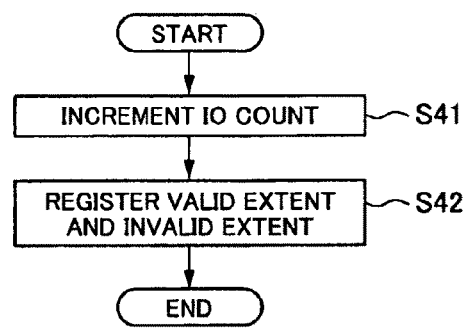
FIG. 14 is a flowchart explaining the statistical information final processing.

As shown in FIG. 14, each channel adapter 22 performs the statistical information final processing as a part of the learning processing by searching the statistical information management table 58, incrementing the IO count (S41), respectively registering the valid extent amount 206 and the invalid extent amount 208 in the statistical information management table 56 (S42), and then ends this processing routine.

In this embodiment, when the controller 12 receives commands from a plurality of hosts 20, the controller 12 analyzes whether the IO processing attached to the received commands is random IO processing or sequential IO processing.

Specifically, when the controller 12 receives a command including random IO processing and the reception of commands is complete, it determines, based on valid extents which are access ranges that are different from the access range (extent) designated in the DX command and prescribed in the seek parameters attached to then LOC command, whether at least a part of such valid extents overlaps, and executes extent exclusive wait processing which causes access to the logical volume 40 to enter a wait state or the access processing to the logical volume 40 based on the determination result.

Contrarily, if the controller 12 receives a command including sequential IO processing and much time is required until receiving all commands and the reception of commands is incomplete, it determines, based on the access range (extent) designated in the DX command, whether at least a part of the access ranges (extents) designated in the DX command overlaps, and executes extent exclusive wait processing which causes access to the logical volume 40 to enter a wait state or the access processing to the logical volume 40 based on the determination result.

According to the present embodiment, since whether to execute the extent exclusive wait processing is determined based on the valid extents prescribed with the seek parameters attached to the LOC command as the access range that is narrower than the access range (extent) designated in the DX command upon receiving a command including random IO processing, it is possible to inhibit the extent exclusive wait processing from increasing, shorten the time required for analyzing and processing the commands from the plurality of hosts 20, and speed up the processing.

EXPLANATION OF REFERENCE NUMERALS

10 storage system, 12 controller, 14 disk drive, 16 management console, 18 network, 20 host, 22 channel adapter, 24 connection, 26 shared memory, 28 cache memory, 30 disk adapter, 32 management terminal, 40 logical volume, 50, 54, 56 extent tables, 58 statistical information management table

The invention claimed is:
1. A storage system, comprising:
a controller connected to a plurality of hosts and which analyzes and processes commands from the plurality of hosts; and
a plurality of disk drives forming one or more logical volumes to be accessed by the controller, and
wherein, upon receiving commands from the plurality of hosts, the controller analyzes whether the IO processing attached to the received commands is random IO processing or sequential IO processing, and executes extent exclusive wait processing which causes access to the logical volume to enter a wait state or access processing to the logical volume in accordance with the analytical result,
wherein, when the controller analyzes that the IO processing attached to the received commands is random IO processing, the controller determines, based on valid extents which are access ranges that are different from the access range designated in each DX command and prescribed in seek parameters within information attached to an LOC command, whether at least a part of each of the valid extents overlaps;

the controller executes extent exclusive wait processing which causes access to the logical volume to enter a wait state upon obtaining a positive determination result in this determination; and the controller executes access processing to the logical volume upon obtaining a negative determination result in the determination; and wherein, when the controller analyzes that the IO processing attached to the received commands is sequential IO processing, the controller determines whether a competition ratio occupied by an IO count in which at least a part of the access range designated in each of the DX commands overlaps within the IO count to the same logical volume among the plurality of logical volumes exceeds a first threshold value, and whether an invalid extent ratio occupied by invalid extents showing an access range outside the valid extent among the access ranges designated in each of the DX commands exceeds a second threshold value;

the controller determines whether information attached to each of the DX commands is short if the competition ratio exceeds the first threshold value and the invalid extent ratio exceeds the second threshold value;

the controller executes processing of waiting to receive all information attached to each of the DX commands upon obtaining a determination result to the effect that the information attached to each of the DX commands is short; and the controller executes the extent exclusive wait processing or the access processing to the logical volume based on the access range designated in each of the DX commands upon obtaining a determination result to the effect that the information attached to each of the DX commands is long.

2. The storage system according to claim 1, wherein, when the controller analyzes that the IO processing attached to the received commands is random IO processing, the controller selects the extent exclusive wait processing or the access processing based on a valid extent to be used for actually accessing the commands within the information attached to the commands.

3. The storage system according to claim 1, wherein, when the controller analyzes that the IO processing attached to the received commands is random IO processing, the controller selects the extent exclusive wait processing or the access, processing based on a valid extent to be used for actually accessing the commands within the information attached to the command; and wherein, when the controller analyzes that the IO processing attached to the received commands is sequential IO processing, the controller selects the extent exclusive wait processing or the access processing based on an extent designated in the command.

4. A storage system, comprising:

a controller connected to a plurality of hosts and which analyzes and processes commands from the plurality of hosts; and a plurality of disk drives forming one or more logical volumes to be accessed by the controller, and wherein, upon receiving commands from the plurality of hosts, the controller analyzes whether the IO processing attached to the received commands is random IO processing or sequential IO processing, and executes extent exclusive wait processing which causes access to the logical volume to enter a wait state or access processing to the logical volume in accordance with the analytical result, wherein, when the controller analyzes that the IO processing attached to the received commands is random IO processing, the controller determines, based on valid extents which are access ranges that are different from the access range designated in each of the commands and which show access ranges for actually accessing the logical volume, whether at least a part of the valid extents of each of the commands overlaps; the controller executes extent exclusive wait processing which causes access to the logical volume to enter a wait state upon obtaining a positive determination result in this determination; and the controller executes access processing to the logical volume upon obtaining a negative determination result in the determination; and wherein, when the controller analyzes that the IO processing attached to the received commands is sequential IO processing, the controller determines whether at least a part of the access range designated in each of the commands overlaps based on the access range designated in each of the commands;

the controller executes extent exclusive wait processing which causes access to the logical volume to enter a wait state upon obtaining a positive determination result in this determination; and the controller executes access processing to the logical volume upon obtaining a negative determination result in the determination.

5. A storage system, comprising:

a controller connected to a plurality of hosts and which analyzes and processes commands from the plurality of hosts; and a plurality of disk drives forming one or more logical volumes to be accessed by the controller, and wherein, upon receiving commands from the plurality of hosts, the controller analyzes whether the IO processing attached to the received commands is random IO processing or sequential IO processing, and executes extent exclusive wait processing which causes access to the logical volume to enter a wait state or access processing to the logical volume in accordance with the analytical result, wherein, when the controller analyzes that the IO processing attached to the received commands is random IO processing, the controller determines, based on valid extents which are access ranges that are different from the access range designated in each of the commands and which show access ranges for actually accessing the logical volume, whether at least a part of the valid extents of each of the commands overlaps;

the controller executes extent exclusive wait processing which causes access to the logical volume to enter a wait state upon obtaining a positive determination result in this determination; and the controller executes access processing to the logical volume upon obtaining a negative determination result in the determination; and wherein, when the controller analyzes that the IO processing attached to the received commands is sequential IO processing, the controller determines whether a competition ratio occupied by an IO count in which at least a part of the access range designated in each of the commands overlaps within the IO count to the same logical volume among the plurality of logical volumes exceeds a first threshold value, and whether an invalid extent ratio occupied by invalid extents showing an access range outside the valid extent among the access ranges designated in each of the commands exceeds a second threshold value; the controller determines whether information attached to each of the commands is short if the competition ratio exceeds the first threshold value and the invalid extent ratio exceeds the second threshold value;

the controller executes processing of waiting to receive all information attached to each of the commands upon obtaining a determination result to the effect that the information attached to each of the commands is short; and the controller executes the extent exclusive wait processing or the access processing to the logical volume based on the access range designated in each of the commands upon obtaining a determination result to the effect that the information attached to each of the commands is long.

6. A multiple extent exclusive control method of a storage system comprising a controller connected to a plurality of hosts and which analyzes and processes commands from the plurality of hosts, and a plurality of disk drives forming one or more logical volumes to be accessed by the controller, wherein the controller executes:

a step of analyzing whether the IO processing attached to the received commands is random IO processing or sequential IO processing upon receiving commands from the plurality of hosts;

a step of executing extent exclusive wait processing which causes access to the logical volume to enter a wait state or access processing to the logical volume in accordance with the analytical result of the analysis step;

a step of determining, based on valid extents which are access ranges that are different from the access range designated in each of the commands and which show access ranges for actually accessing the logical volume, whether at least a part of the valid extents of each of the commands overlaps upon analyzing that the IO processing attached to the received commands is random IO processing;

a step of executing extent exclusive wait processing which causes access to the logical volume to enter a wait state upon obtaining a positive determination result in the determination step;

a step of executing access processing to the logical volume upon obtaining a negative determination result in the determination step;

a step of determining whether at least a part of the access range designated in each of the commands overlaps based on the access range designated in each of the commands upon analyzing that the IO processing attached to the received commands is sequential IO processing;

a step of executing extent exclusive wait processing which causes access to the logical volume to enter a wait state upon obtaining a positive determination result in the determination step; and a step of executing access processing to the logical volume upon obtaining a negative determination result in the determination step.

7. The multiple extent exclusive control method of a storage system according to claim 6, wherein the controller additionally executes:

a step of selecting the extent exclusive wait processing or the access processing based on a valid extent to be used for actually accessing the commands within the information attached to the command upon analyzing that the IO processing attached to the received commands is random IO processing.

8. The multiple extent exclusive control method of a storage system according to claim 6, wherein the controller additionally executes:

a step of selecting the extent exclusive wait processing or the access processing based on a valid extent to be used for actually accessing the commands within the information attached to the command upon analyzing that the IO processing attached to the received commands is random IO processing; and a step of selecting the extent exclusive wait processing or the access processing based on an extent designated in the command upon analyzing that the IO processing attached to the received commands is sequential IO processing.

* * * * *